(No Model.)
C. BARRETT.
STOVE BRUSH.
No. 308,338. Patented Nov. 25, 1884.
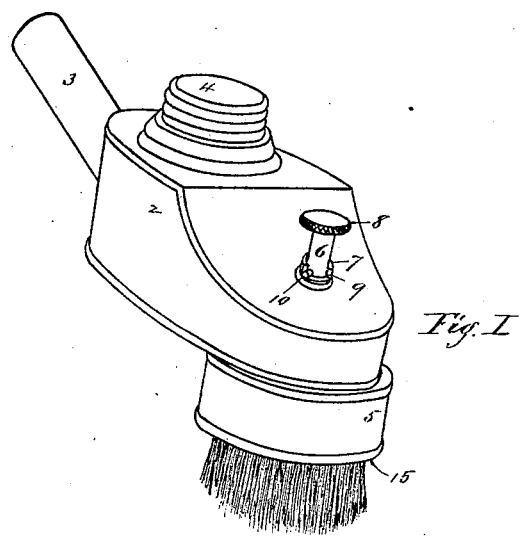
Fig. I
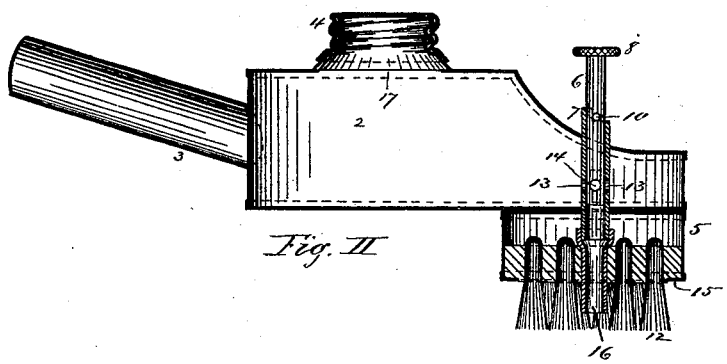
Fig. II
Witnesses.
E. S. Hurlbut
E. E. Curtis
Inventor.
Coleman Barrett
By T. A. Curtis.
his atty.

UNITED STATES PATENT OFFICE.

COLEMAN BARRETT, OF WESTFIELD, MASSACHUSETTS.

STOVE-BRUSH.

SPECIFICATION forming part of Letters Patent No. 308,338, dated November 25, 1884.

Application filed October 10, 1883. (No model.)

*To all whom it may concern:*

Be it known that I, COLEMAN BARRETT, of Westfield, in the county of Hampden and State of Massachusetts, have invented a new and useful Improvement in Stove-Brushes, of which the following is a specification and description.

The object of my invention is to provide a stove-brush having a compartment or vessel in which the stove-blacking is contained in a liquid form, and an orifice or passage provided with a valve by means of which the said blacking is permitted to flow from the said compartment or vessel to the brush as fast as it may be required in applying the blacking to the stove; and I accomplish this by the mechanism substantially as hereinafter described, and illustrated in the accompanying drawings, in which—

Figure I is a perspective view of my invention, and Fig. II is a longitudinal vertical section of the same.

In the drawings, 2 represents the vessel or receptacle to contain the liquid blacking, and is made preferably of tinned sheet metal, and in this case forms the body of the brush; and an aperture, 17, is made in the top of this vessel, which is closed with an ordinary screw-cap, 4, and a handle, 3, may be secured to one end of the vessel for greater convenience in using it. To the lower side of this vessel, and preferably at one end, I secure a cylindrical case, 5, open at its lower end, into which I insert a circular brush, 15, made preferably of wood, with the bristles 12 secured therein in any ordinary manner. I secure in this vessel 2 a tube, 7, which extends entirely through said vessel in a vertical direction, with one or more holes, 13, made through this tube within and near the bottom of said vessel, the lower end of the tube 7 extending down into the case 5, with a rubber or other suitable tube attached to its lower end; or the tube 7 itself may extend down into the brush sufficiently to convey the liquid to the brush. A second tube, 6, extends down into the tube 7 through the open upper end of the latter, with a button, 8, on its upper end by which to turn it, and one or more holes, 14, are made in the inner tube, 6, which coincide in position with the holes 13, made in the tube 7. For convenience in manipulating the valve 6, formed by this tube, I cut away a portion of the upper end of the tube 7 at 9, leaving a vertical shoulder at each side of the space 9, and I insert a pin, 10, in the tube 6, so that when the latter is inserted in the tube 7 at its upper end, and forced down until the pin rests upon the top of the tube 7 in the space 9, and with the pin against one of the shoulders, the holes 13 and 14 will correspond in position; but as the tube 6 is turned by its button at the top, the hole 14 is turned away from the hole 13 until the pin 10 abuts against the opposite shoulder, when the holes are entirely shut off from each other.

To use the brush, any desired quantity of the ordinary stove-blacking may be placed in the receptacle 2, together with the proper quantity of water, and the vessel shaken to thoroughly mix and dissolve the blacking. The tube 6 is then turned by its button 8 so that the holes 13 and 14 may communicate more or less, to let down the required quantity of the liquid blacking, the latter passing from the interior of the vessel 2 through the holes 13 and 14 into the inside tube or valve, 6, and thence down through the lower open end of both tubes 6 and 7 and into and through the short rubber tube 16, attached to the lower end of the tube 7, and into the brush. When the brush is not required for use, the valve 6 is turned to shut off the flow of blacking from the vessel or receptacle 2, and the instrument is laid away for future use. This vessel or receptacle may be made of any size to hold any desired quantity of liquid blacking, and its use will save much annoyance and trouble, as the hands will not be soiled by its use, nor the blacking spilled or spattered on the floor, these faults being a great objection in the use of the ordinary brushes. As the tube 6, provided with its hole 14 and operating within and in connection with the tube 7, performs the function of a valve, I have denominated it a valve in this connection.

Having thus described my invention, what I claim as new is—

The improvement in fountain blacking-brushes hereinbefore described, consisting of a chamber, 2, with a suitable opening at the top for the introduction of blacking, a brush secured to the lower side of the chamber, a tube, 7, extending through the chamber and into the brush, and having a perforation, 13, within the chamber, and a tube, 6, located within and fitting the tube 7, and provided with an opening, 14, which may be moved into or out of coincidence with the opening 13 in the tube 7 by the movement of the tube 6, as and for the purpose described.

COLEMAN BARRETT.

Witnesses:
T. A. CURTIS,
C. S. HURLBUT.